Nov. 20, 1928.

E. A. HALL 1,692,439

GRINDING TOOL

Filed Dec. 5, 1927

Inventor
Ernest A. Hall
By Owen & Owen
Attorneys

Patented Nov. 20, 1928.

1,692,439

UNITED STATES PATENT OFFICE.

ERNEST A. HALL, OF TOLEDO, OHIO, ASSIGNOR TO THE HALL MANUFACTURING CO., OF TOLEDO, OHIO, A CORPORATION OF OHIO.

GRINDING TOOL.

Application filed December 5, 1927. Serial No. 237,615.

This invention relates to a grinding tool, and more especially to the structure of the holder in which the grinding element is secured.

One of the important objects of the invention is to provide a holder having a simple and improved cooperative relationship to the member which supports it, so that the holder may be guided longitudinally toward or away from the article to be ground, or may be easily and quickly taken out and reversed end for end or replaced by a holder with a new grinding element or one of a different nature.

The invention will be more specifically described in connection with the accompanying drawing, which shows one adaptation thereof, in which Figure 1 is a plan view of the grinding element in operative position, with adjacent portions of the machine in which it is used.

Figure 1:
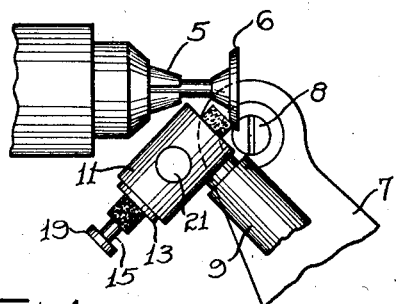
Figure 2:
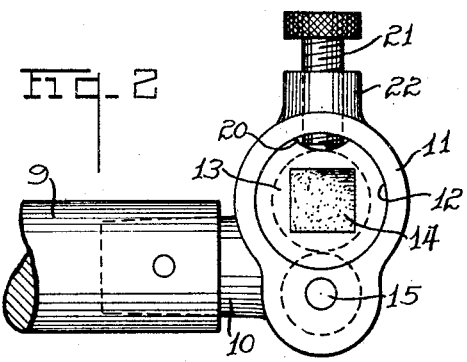
Fig. 2 is an end elevation, on a larger scale, showing the grinding tool and the support to which it is secured.
Figure 3:
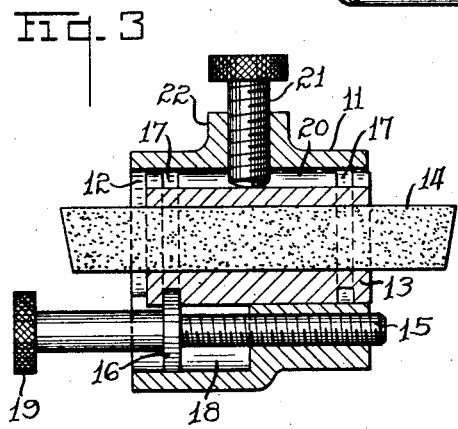
Fig. 3 is a central longitudinal section through the holder and its housing.

The invention is shown in connection with a grinding machine having a chuck 5 rotated by any suitable means and adapted to receive the valve 6 which is to be ground. The machine has a frame 7 angularly adjustable about a stud or screw 8 and having a shaft 9 secured thereto in any suitable manner. Secured to the end of the shaft 9 is a stud 10 which is integrally or otherwise connected to a housing 11 and supports the same.

The housing 11 is formed with a longitudinal bore 12 adapted to receive a holder 13. A grinding element 14 is firmly secured in the holder 13, preferably by casting the holder thereon.

An adjusting screw 15 has a threaded connection with the lower part of the housing 11 in parallel relation to the holder 13 and the grinding element 14. A collar 16 is integrally or otherwise secured to the screw 15 and extends into the bore 12, the holder 13 being formed with a peripheral groove or channel 17 for receiving the same. The holder 13 is preferably provided with two of these channels 17, one near each end and the grinding element 14 extends from each end of the holder so that when one end of the grinding element is used up the holder may be reversed and the other end used.

The lower part of the housing 11 is also formed with a bore 18 extending part way of its length and intersecting the bore 12 so as to provide space for the adjustment of the collar 16 longitudinally with the screw. The outer end of the screw may be provided with a knurled head 19 or other suitable means for adjusting the same to advance or retract the holder and the grinding element 14.

The holder 15 is formed on one side with a groove 20 adapted to receive the end of a thumb-screw 21 which is inserted through a boss 22 formed on the upper side of the housing, and is disposed at right angles to the holder 13. The inner end of the screw 21 has a convex surface with the same radius of curvature as the bottom of the groove 20 and may be adjusted tightly enough to hold the tool against chattering.

The bottom of the groove 20 also has substantially the same radius as the collar 16 and when the screw 21 is retracted from the groove the holder 13 may be rotated 180° or until the groove is in registry with the upper portion of the collar 16. The holder 16 may then be moved longitudinally out of the housing and reversed or another holder substituted therefor, without removing the screw 15. The channels 17 extend around the entire circumference of the holder so as to permit this operation.

From the foregoing description it will be understood that the screw 21 cooperates with the groove 20 to provide a guide for the holder 13, preventing rotation thereof while permitting it to be adjusted longitudinally. The groove 20 is also arranged to cooperate with the collar 16 and permit the free movement of the holder longitudinally after it has been given a half turn.

While I have shown and described in detail one embodiment of the invention, it is apparent that the same may be considerably modified in its construction without departing from the scope of the invention as claimed.

Although the invention has been devised with particular reference to its use in a machine for grinding disc valves it is obvious that it may also be used in connection with various other machines having similar tool holding means.

What I claim is:

1. In a machine of the character described, a tool holder having a longitudinal groove, a housing in which the holder is mounted, means for adjusting the tool longitudinally in the housing, means cooperating with said groove to guide the holder longitudinally but adjustable away from the groove to permit the holder to be rotated, said holder having means normally engageable with the holder adjusting means to fix the longitudinal position of the holder but releasable to permit free longitudinal movement of the holder after the latter has been partially rotated.

2. In a machine of the character described, a tool holder, a housing in which the holder is mounted, means for adjusting the holder longitudinally in the housing, guide means normally preventing rotation of the holder while it is so adjusted, said guide means being adjustable to a position to permit the rotation of the holder about its longitudinal axis, and means for rendering the holder adjusting means inoperative and permitting removal of the holder longitudinally from the housing when the holder has been rotated to a predetermined extent.

3. In a machine of the character described, a housing, a tool holder rotatably mounted therein, releasable means for securing the holder against rotation when it is in operating position, and means for normally fixing the position of said holder longitudinally, said last mentioned means being inoperative for that purpose only when the holder has been rotated about its longitudinal axis to a predetermined angle from its operating position.

4. In a machine of the character described, a cylindrical tool holder having a circumferential channel and a longitudinal groove, a housing in which the holder is mounted, an adjusting screw having a collar normally engaging said channel to adjust the holder as the screw is adjusted, means normally cooperating with said groove to prevent rotation of the holder while the latter is adjusted longitudinally, said last mentioned means being adjustable to release said holder and permit its rotation, said groove being arranged so as to register with the channel engaging portion of the collar when the holder has been rotated to a predetermined extent, thus permitting the holder to be removed longitudinally from the housing regardless of the position of said adjusting screw.

5. In a machine of the character described, a cylindrical tool holder having a circumferential channel and a longitudinal groove, a housing in which the holder is mounted, an adjusting screw having a collar engaging said channel when the tool is in operating position, said holder being rotatable in the housing to a position in which said groove registers with the channel engaging portion of the collar and permits the holder to be removed longitudinally from the housing independently of the adjusting screw, and guide means adjustable into engagement with said groove to prevent the rotation of the holder when the tool is in operating position.

6. In a machine of the character described, a cylindrical tool holder having a circumferential channel and a longitudinal groove, a housing for said tool, and means cooperating with said channel and groove and selectively operable to adjust the holder longitudinally while holding it against rotation, or to permit rotation of the holder and subsequent removal of the same longitudinally of the housing after the holder has been rotated to a predetermined extent.

7. In a machine of the character described, a cylindrical tool holder having a circumferential channel and a longitudinal groove, a housing for said tool, screws cooperating with said channel and groove respectively and selectively operable, either to adjust the holder longitudinally while holding it against rotation, or to permit rotation of the holder and subsequent removal of the same longitudinally of the housing after the holder has been rotated to a predetermined extent.

8. In a machine of the character described, a cylindrical tool holder having a circumferential channel and a longitudinal groove, a housing for said tool, two screws arranged respectively parallel and perpendicular to the longitudinal axis of the holder and having threaded engagement with the housing, the screw which is arranged parallel having a circumferential collar, said collar and the point of the perpendicularly arranged screw cooperating with the channel and groove respectively and selectively operable, either to adjust the holder longitudinally while holding it against rotation, or to permit rotation of the holder and subsequent removal of the same longitudinally of the housing after the holder has been rotated to a predetermined extent.

In testimony whereof, I have hereunto signed my name to this specification.

ERNEST A. HALL.